United States Patent [19]

Dantam et al.

[11] Patent Number: 4,948,684

[45] Date of Patent: Aug. 14, 1990

[54] ALKALINE ZINC BATTERY HAVING IMPROVED SHELF-LIFE, RECHARGEABILITY, CHARGE RETENTION AND CAPACITY RETENTION

[75] Inventors: Theresa M. Dantam, Rochester Hills, Mich.; Richard A. Jones, Anderson, Ind.

[73] Assignee: General Motors Corporation, Detroit, Mich.

[21] Appl. No.: 235,127

[22] Filed: Aug. 23, 1988

[51] Int. Cl.$^5$ ............................................. H01M 10/26
[52] U.S. Cl. ...................................... 429/206; 429/198
[58] Field of Search ................................. 429/198, 206

[56] References Cited

U.S. PATENT DOCUMENTS 4,306,003 12/1981 Henriksen ........................... 429/101
4,471,038 9/1984 Vyas ............................... 429/223 X

FOREIGN PATENT DOCUMENTS 62-177867 8/1987 Japan .

OTHER PUBLICATIONS

Itoh et al., Chem. Abs. No. 107: 239 784, 1987.
Chemical Abstract 93:103814, 1980.
Derwent Abstract, 80-47045, 1980.
Derwent Abstract, 80-39130, 1980.

*Primary Examiner*—Stephen J. Kalafut
*Attorney, Agent, or Firm*—Lawrence B. Plant

[57] ABSTRACT

An alkaline zinc battery having a zinc electrode comprising a copper-containing conductor embedded in a zinc-rich active and immersed in a concentrated alkaline electrolyte containing a benzotriazole to suppress dissolution of copper in the electrolyte when the cell is fully discharged.

2 Claims, No Drawings

ALKALINE ZINC BATTERY HAVING IMPROVED SHELF-LIFE, RECHARGEABILITY, CHARGE RETENTION AND CAPACITY RETENTION

This invention relates to alkaline Zinc galvanic cells (i.e., electrical storage batteries) having an extended shelf life and improved rechargeability and charge retention following prolonged periods of inactivity.

BACKGROUND OF THE INVENTION

Alkaline zinc galvanic cells are well known in the art and comprise essentially one or more negative polarity zinc electrodes spaced from a counterelectrode (e.g. NiOOH) of opposite polarity and a concentrated (i.e., greater than about 15%) aqueous alkaline electrolyte (e.g. KOH) bridging the space between the electrodes. A microporous separator material physically divides the opposite polarity electrodes from each other to prevent electronic flow while permitting ionic flow therebetween. These cells typically employ a zinc electrode comprising a zinc-rich active material having a conductive substrate embedded therein to both support and provide conductivity throughout the active material. One such cell, for example, is described in Jones U.S. Pat. No. 4,358,517, issued Nov. 9, 1982, is assigned to the assignee of the present invention, and is intended to be incorporated herein by reference. Jones specifically describes a zinc electrode having an active material comprising zinc oxide, calcium hydroxide, $Pb_3O_4$, and cellulose fibers supported on a conductive substrate/current collector (i.e., copper).

The substrates for the zinc-rich active material preferably comprise copper for optimum electrode conductivity. So long as metallic zinc is present in the zinc electrode (especially in contact with the copper), the substrate is protected from dissolution in the electrolyte. However, after the zinc electrode has become fully discharged (i.e., by use or self-discharge of the battery) and the zinc has become oxidized, the copper is left unprotected. If the cell remains in this state for a prolonged period of time, the unprotected copper will dissolve in the electrolyte and the performance of the cell deteriorates. In this regard, dissolved copper from the electrolyte deposits in the pores of the separator dividing the electrodes which, depending on its severity, can cause the cell to no longer accept or retain a charge. More specifically, if copper loading of the separator is severe enough the cell can no longer be recharged and must be replaced. If on the other hand, copper loading of the separator is light, the cell may be charged and used immediately (albeit at reduced capacity), but otherwise will rapidly self-discharge and accordingly cannot be left on open circuit stand for any appreciable period of time.

It is the object of this invention to provide an alkaline zinc galvanic cell having improved shelf life, rechargeability, charge retention and capacity retention following complete discharge of the cell's zinc electrodes by means of an electrolyte additive for retarding the dissolution of copper from copper-containing zinc electrodes used therein. This and other objects and advantages of the present invention will be readily apparent from the description thereof which follows.

BRIEF DESCRIPTION OF THE INVENTION

The present invention comprehends the addition of a small but effective amount of benzotriazole (hereafter BTA) to an alkaline zinc galvanic cell having a copper-containing zinc electrode substrate to suppress dissolution of the copper in the electrolyte when the zinc electrode if fully discharged and thereby extend the shelf-life and improve the rechargeability and charge retention of the cell following prolonged periods in such discharged state. Concentrations of BTA between about $\frac{1}{4}$% and about 7% by weight are effective to suppress dissolution of copper in battery-strength alkaline electrolyte. Room temperature copper dissolution tests have shown that 1% BTA addition to concentrated KOH suppresses copper dissolution by over 80%. Concentrations above about 2% by weight appear to offer no significant advantages over the lower concentrations and in fact unnecessarily increase resistivity of the electrolyte and cost of the battery. BTA concentrations of about $\frac{1}{4}$% to about 2% by weight are preferred as they do not perceptibly interfere with the battery's electrochemical performance yet permits the cell (battery) to be recharged and operate successfully with full capacity after long periods of non-use.

EXAMPLES/TESTS

In one test, two identical Ni-Zn cells were made essentially as described in Jones No. 4,358,517 supra using 26.5% KOH electrolyte. The cells had a design capacity of 147.5 ampere-hours when discharged at 42 amperes to an outpoint of 1.0 volts following a charge of 155 amp-hrs delivered at 16 amperes. The test cell had 1.0% BTA added to the 26.5% KOH prior to filling, while the other contained no additive and was used as a control with which to compare the performance of the test cell. After one year on open circuit stand, the cells were charged and discharged several times as set forth above. The results of those tests are shown in table I and generally show a lower initial capacity and, after initialization, a more rapid decline in the capacity of the control cell than in the BTA-containing test cell.

TABLE I

|  | KOH + 1% BTA (Discharge AH) | KOH (Discharge AH) |
|---|---|---|
| Test 1 | 147.7 | 139.2 |
| Test 2 | 147.8 | 141.0 |
| Test 3 | 150.2 | 144.0 |
| Test 4 | 150.3 | 143.3 |
| Test 5 | 150.2 | 142.1 |
| Test 6 | 149.5 | 140.6 |

The same cells were then placed on open stand between the end of charge and the start of discharge. The results of that test are reported in Table II and show that the control cell had a significant drop in initial capacity and a more rapid decline in capacity thereafter than the BTA-containing test cell.

TABLE II

|  | KOH + 1% BTA (Discharge AH after 1 week stand) | KOH (Discharge AH after 1 week stand) |
|---|---|---|
| Test 1 | 120.3 | 98.6 |
| Test 2 | 122.9 | 86.4 |

In another series of tests, two identical cells (i.e. having polpropylene mats between the electrodes and ca. 206.5 AH theoretical capacity) were tested—one with 1% BTA in the 26.5% KOH electrolyte (i.e., cell A) and one with no BTA present (i.e., cell B). Another similar cell (i.e., cell C) was tested with 1% BTA in the electrolyte but with a Nylon mat replacing the polypropylene mat between the plates. The cells were all formed with a 16 amp constant current charge for 372 amp-hrs after which they were cycled 40 times at 100% depth of discharge (DOD). The cells were then left on open circuit stand for 65 weeks. Between the 20$^{th}$ and 30$^{th}$ week all three cells had dropped from the zinc vs. nickel voltage to the lead vs. nickel voltage and by the 50$^{th}$ week cells B and C had dropped to the copper vs. nickel voltage. Cell A remained at the lead vs. nickel voltage for the full 65 weeks OC stand period of the test. After 65 weeks, the three cells were recharged with a 1.93 V voltage lid and a 16 A current lid for 255 AH. The cells recharged for 16 hours and discharged 140–170 AH for 65%–81% charge efficiency. AA spectroscopic analysis of the electrolyte showed that the BTA-free cell B had 187 times more copper in the electrolyte than cell A and 22 times more copper in the electrolyte than cell C. Finally, the cells were recharged again to 155 AH at 16 amps then left on open circuit stand for 7 days before discharging. The BTA-free cell B lost voltage and had no capacity while the BTA-containing cells A and C had 153 and 137 AH capacity left respectively.

These tests show that the addition of small amounts of BTA to the electrolyte improves the rechargeability and subsequent charge retention of batteries which have stood in discharged state for a prolonged period of time.

While the invention has been disclosed primarily in terms of specific embodiments thereof, it is not intended to be limited thereto but rather only to the extent set forth hereafter in the claims which follow.

The embodiments of the invention in which an exclusive property or privilege is claimed are defined as follows:

1. In an alkaline zinc galvanic rechargeable cell comprising a zinc electrode having a copper-containing conductor embedded in a zinc-rich active material, a counterelectrode spaced from said zinc electrode, and a concentrated, aqueous alkaline electrolyte permeating said active material and bridging the space between the electrodes, the improvement wherein said electrolyte includes sufficient benzotriazole to suppress dissolution of said copper from said conductor when said zinc electrode is substantially fully discharged and thereby extend the shelf-life and improve the rechargeability and charge retention of said cell following prolonged periods in such discharged state.

2. A cell according to claim 1 wherein said benzotriazole comprises about 0.25% to about 2% by weight of said electrolyte.

* * * * *